United States Patent [19]
Maddalena

[11] Patent Number: 6,062,787
[45] Date of Patent: May 16, 2000

[54] TAMPER RESISTANT VALVE STEM CAP

[76] Inventor: Kris L. Maddalena, 1750 S. Price Rd., Apt. 259, Tempe, Ariz. 85281

[21] Appl. No.: 09/218,978

[22] Filed: Dec. 22, 1998

[51] Int. Cl.[7] .............................. F16B 37/08; F16B 37/14
[52] U.S. Cl. .......................... 411/429; 411/373; 411/432; 411/910
[58] Field of Search ................................ 411/371.2, 372, 411/373, 429, 432, 403, 405, 919, 910

[56] References Cited

U.S. PATENT DOCUMENTS

| | | |
|---|---|---|
| D. 86,154 | 2/1932 | Broecker . |
| D. 255,540 | 6/1980 | Baylis . |
| D. 306,420 | 3/1990 | Robinson . |
| 1,447,564 | 3/1923 | Norlund et al. . |
| 1,496,448 | 3/1924 | Norlund . |
| 2,633,176 | 3/1953 | Fears . |
| 3,152,818 | 10/1964 | Ivins . |
| 3,261,254 | 7/1966 | Pinkerton ............................. 411/910 X |
| 4,027,572 | 6/1977 | Burge . |
| 4,540,322 | 9/1985 | Coffia . |
| 4,544,054 | 10/1985 | Brown . |
| 4,645,422 | 2/1987 | Brushaber . |
| 4,726,723 | 2/1988 | Bainbridge ............................. 411/432 |
| 4,742,702 | 5/1988 | Swertz ................................. 411/910 X |
| 4,869,633 | 9/1989 | Hayashi . |
| 4,897,008 | 1/1990 | Parks . |
| 5,112,176 | 5/1992 | McCauley et al. . |
| 5,325,981 | 7/1994 | Klomhaus et al. . |
| 5,360,304 | 11/1994 | Notaro et al. . |
| 5,630,687 | 5/1997 | Robinson . |

FOREIGN PATENT DOCUMENTS

| | | |
|---|---|---|
| 170803 | 11/1921 | United Kingdom . |
| 2095356 | 9/1982 | United Kingdom ............... 411/910 X |

*Primary Examiner*—Neill Wilson
*Attorney, Agent, or Firm*—Richard G. Harrer; Elizabeth A. Dawn

[57] ABSTRACT

A valve stem cap for pneumatic tires which has a lock mechanism to prevent theft and unauthorized tampering with the valve. The valve stem cap comprises an inner core with a first end adapted for threaded engagement with the valve stem of a pneumatic tire. An outer sleeve is rotatably mounted about the inner core. Annular flanges at either end of the device are positioned such that the inner core and outer sleeve are locked together. The second end of the inner core forms a solid surface which is provided with keyways for engaging a matched key. By rotating the key, the inner core is rotated, which, in turn, causes the threads of the inner core to be rotated into or out of engagement with the valve stem.

12 Claims, 5 Drawing Sheets

TAMPER RESISTANT VALVE STEM CAP

This invention relates to a valve stem cap for pneumatic tires which has a lock mechanism to prevent theft and unauthorized tampering with the valve.

BACKGROUND OF THE INVENTION

The air pressure within most pneumatic tires is controlled by introducing or evacuating compressed air through a valve located on the tire rim. These valves are located in a valve stem extending outward from the rim and tire. The valve is operated by pressing downward on the valve core which allows compressed air to be introduced into the tire. In order to prevent the valve from becoming contaminated with debris, a valve cap is removably mounted to the valve stem.

Although the valve cap must be removable for proper maintenance of the air pressure within the tire, this creates several problems. First, vandals can easily remove the valve cap, gain access to the valve, and release all the air from the tire. Second, valve caps are easily stolen, requiring the tire owner to purchase new valve caps.

In an effort to solve these problems, U.S. Pat. No. 5,630,687 ("'687") teaches a tamper resistant valve cap having an inner liner adapted for threaded engagement with a pneumatic tire valve stem, an outer sleeve rotatably mounted about the inner liner, and a screw inserted through the outer sleeve and into an annular channel surrounding the top of the inner liner. Depending on the positioning of the screw, the outer sleeve and inner liner can either move as a single unit, or the sleeve can freely rotate about the liner. When the sleeve and liner move as a unit, the liner can be removed from the valve stem. When the sleeve freely rotates about the liner, it is difficult or impossible for the liner to be removed from the stem.

Although this device does hinder unauthorized removal of a valve cap, it creates some problems of its own. Most notably, the screw means for securing the outer sleeve to the inner liner makes the device difficult to use and maintain. The screw is quite small, and, therefore, difficult to manipulate. This situation is made even worse if the valve cap is mounted on the tire in such a way that the screw is in a particularly inaccessible location. Because of its size, the screw is also susceptible to unintended loss. The vibration of the tire may also result in the dislodging of the screw, and, consequently, the loss of the sleeve.

BRIEF SUMMARY OF THE INVENTION

The valve stem cap of the present invention comprises an inner core, a first end of which is open and adapted for threaded engagement with the valve stem of a pneumatic tire. Rotatably mounted about the inner core is an outer sleeve. Annular flanges at each end of the inner core secure the outer sleeve in place about the inner core. The second end of the inner core is a solid surface provided with keyways. In order to remove or install the valve stem cap, a matched key is engaged with the keyways. By rotating the key, the inner core is rotated, which, in turn, causes the threads of the inner core to be rotated into or out of engagement with the valve stem. Unless one is provided with the special key, rotation of the inner core is prevented, and the valve cap cannot be removed from the valve stem.

It is therefore a principal object of this invention to provide a valve cap which deters unauthorized tampering with the valve of a pneumatic tire.

It is another object of this invention to provide a valve cap which is difficult to steal.

It is a further object of this invention to provide a theft and tamper resistant valve cap of unitary construction.

Other objects of the invention will become apparent hereinafter.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

DETAILED DESCRIPTION OF THE INVENTION

Figure 1:
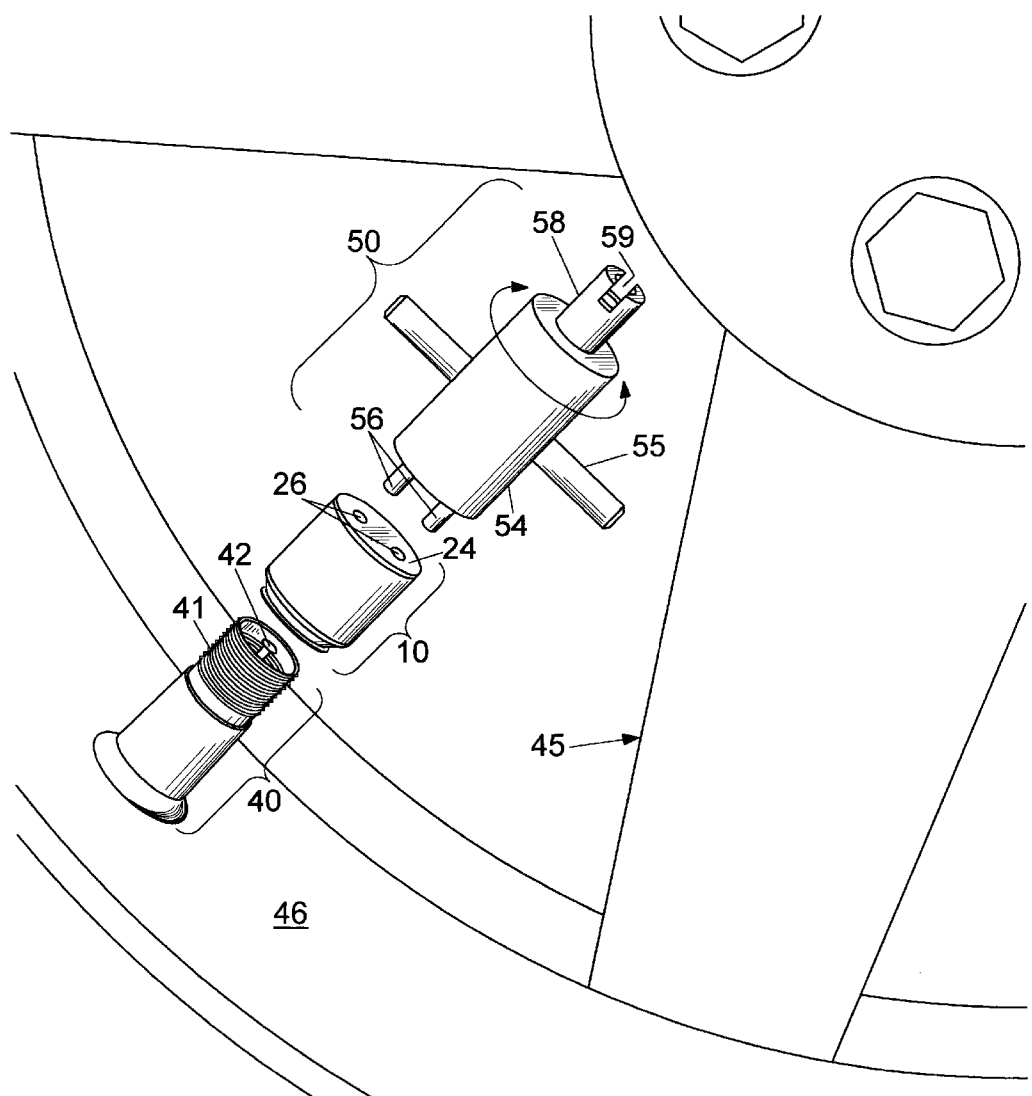
FIG. 1 is an exploded perspective view of the present invention showing its mounting to a valve stem of a tire using a special tool.
Figures 2, 3:
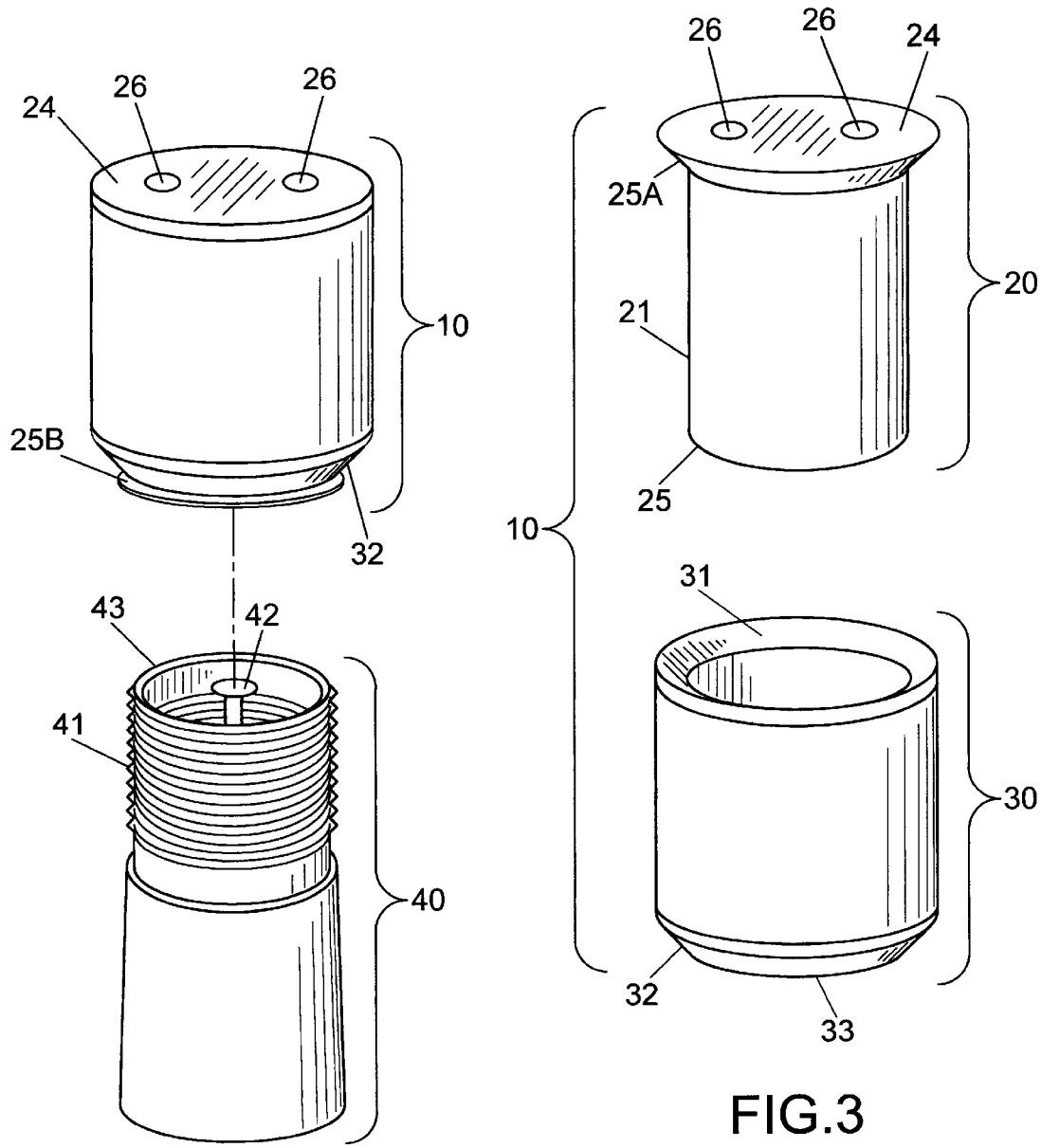
FIG. 2 is an exploded perspective view of the valve cap of the present invention as it is being mounted to a tire valve stem.
FIG. 3 is an exploded perspective view of the valve cap of the present invention.
Figure 5:
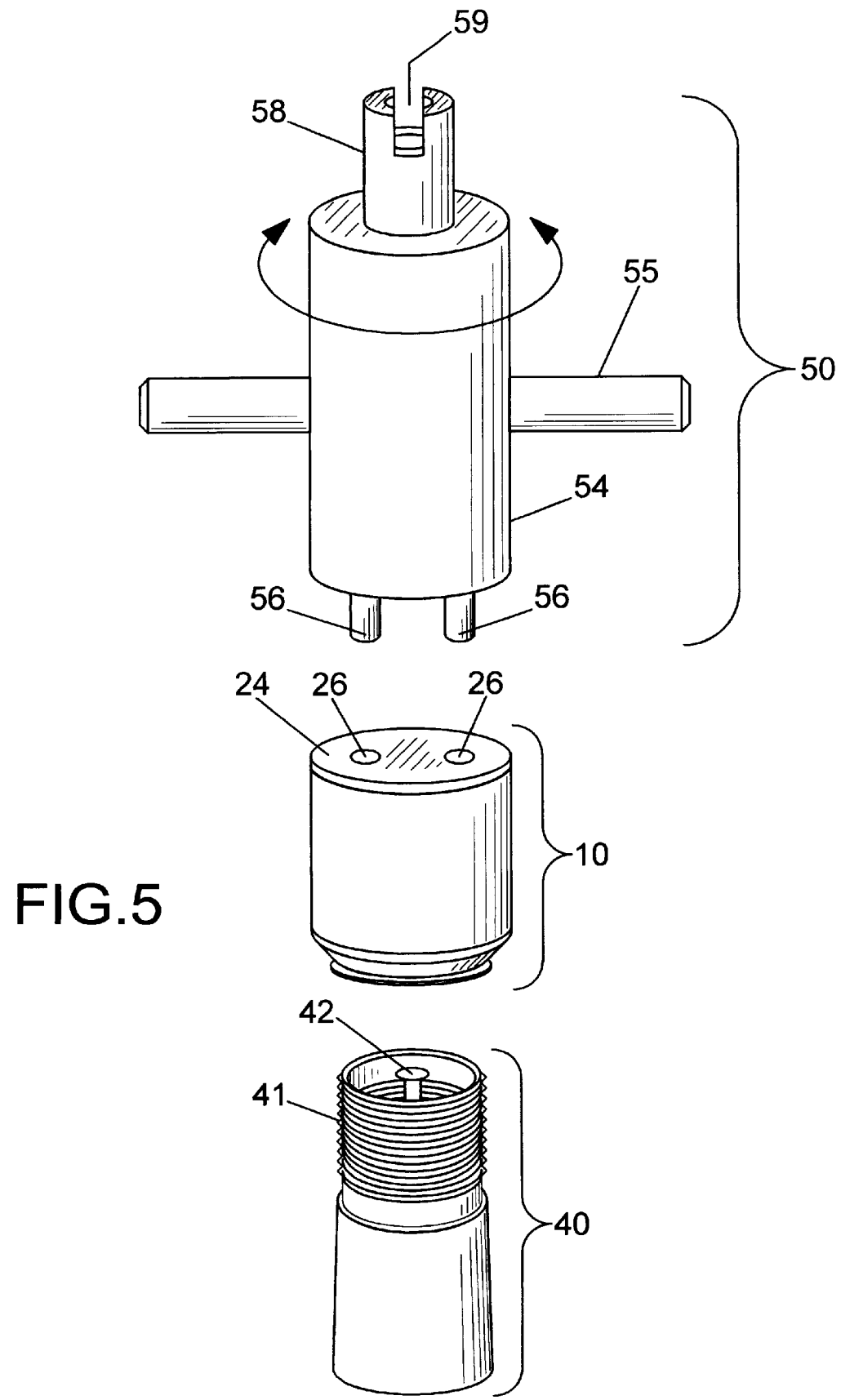
FIG. 5 is a perspective view of the valve cap, valve stem, and key.

As shown in FIGS. 1, 2 and 5, the valve cap 10 of this invention is readily adapted to replace a conventional valve cap as is supplied with pneumatic tires. In FIG. 1, there is also shown a partial view of a vehicle wheel 45 having a rim 46 with a conventional valve stem 40 protruding from the rim. The valve cap 10 is adapted for threaded engagement with threads 41 of valve stem 40. Also shown is a partial view of a valve core 42 positioned in the interior of valve stem 40 which controls the supply of compressed air into the tire and its release therefrom. A special tool 50 is shown which is used to both install and remove valve cap 10 on and off of valve stem 40. Tool 50 has a generally cylindrically shaped main body 54 which is provided with handle 55. Handle 55 passes through the main body and extends outwardly a distance from the main body. One end of the tool is provided with a pair of protruding pins 56 which serve as keys and are complementary to and can engage with keyways 26 which are located in the upper surface 24 of valve cap 10. When pins 56 are inserted into keyways 26, the tool may be rotated in a clockwise direction to tighten the valve cap 10 on the stem 40. Rotating the tool in a counter-clockwise direction will result in a removal of the valve cap from the stem.

As shown, tool 50 is also provided with a valve core removing and inserting tool 58 which can be used to remove or insert valve core 42. The valve core removing portion 59 of tool 50 is known.

Figure 4:
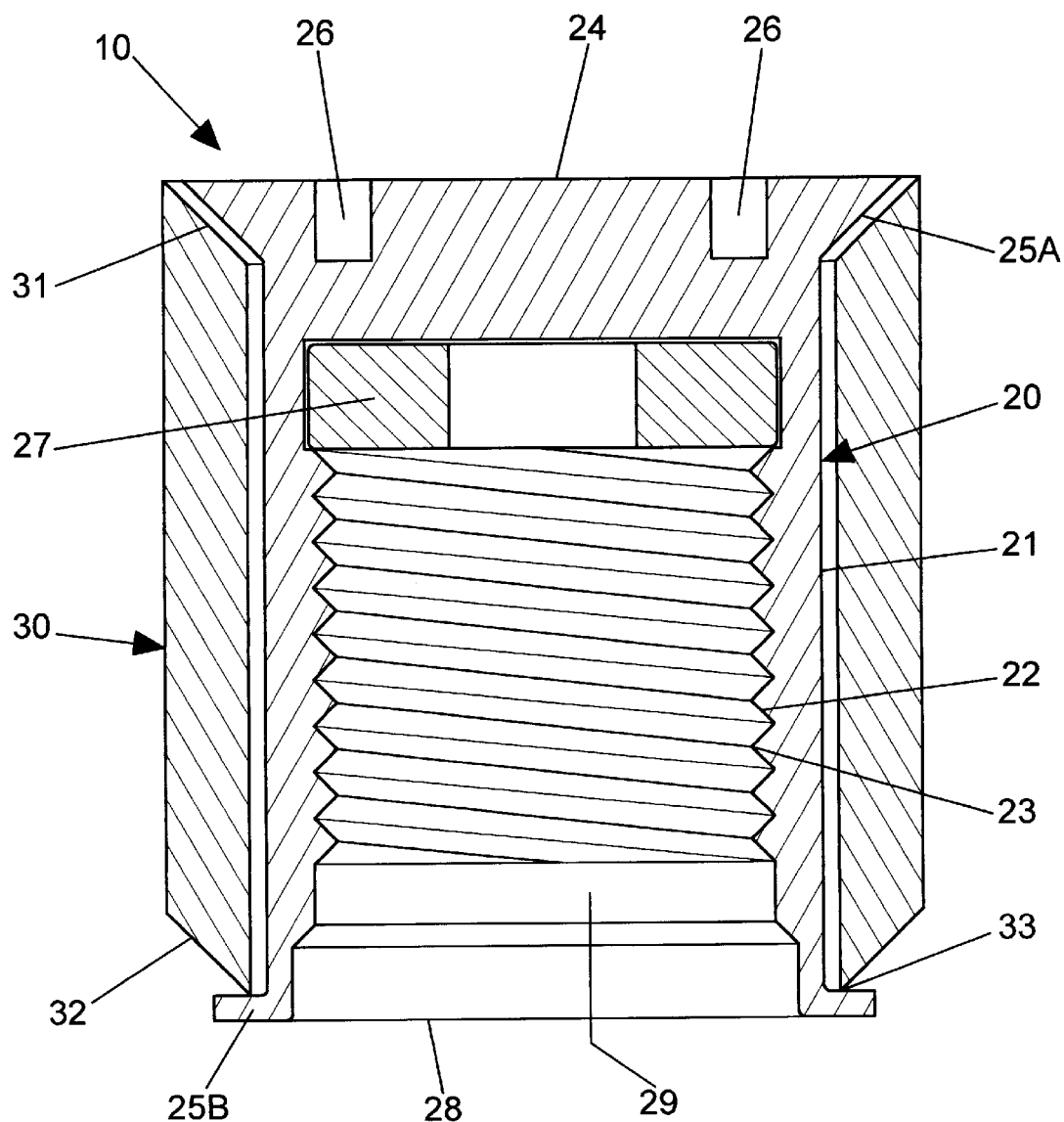
FIG. 4 is a sectional view of a preferred embodiment of the valve cap of the present invention.

As shown in FIGS. 3 and 4, the valve cap 10 of the present invention is of two piece construction comprising an inner core 20 and outer sleeve 30 which closely surrounds the inner core. Inner core 20 is of a generally cylindrical shape and includes an exterior surface 21 and an interior surface 22 having threads 23 which are adapted for threaded engagement with the threads 41 of valve stem 40. Inner core 20 further includes an upper surface 24 and a lower rim 25 which surrounds the opening 28 to cavity 29. A pair of keyways 26 are provided on the upper surface 24 of inner core 20. Cavity 29 should be of a diameter and length such that threads 23 readily engage with threads 41 of the valve stem 40. A sealing gasket 27 can be positioned at the upper end of cavity 29 and is designed to make contact with the upper edge 43 of valve stem 40.

Inner core 20 is also provided with annular flanges 25A and 25B located at each end of the core. As shown in FIG. 4, top annular flange 25A is tapered inwardly from surface 24. At the opposite end of inner core 20, a bottom annular flange 25B extends outwardly at about a right angle from outer surface 21.

Outer sleeve 30 surrounds inner core 20 and is rotatable about core 20. As shown in FIGS. 3 and 4, outer sleeve 30 is a hollow cylinder and is sized such that the inner diameter of sleeve 30 is large enough to permit free rotation of the sleeve about core 20, yet small enough so that it can be secured in place by flanges 25A and 25B. As shown in FIG. 4, the upper end of sleeve 30 has tapered surface 31, the taper of which is complementary to the taper of 25A of core 20. In a preferred embodiment, the bottom end of sleeve 30 is tapered inwardly at 32 forming a knife-like edge 33 which bears against flange 25B. It is believed that by tapering lower portion of sleeve 30, the friction between inner core 20 and sleeve 30 is reduced allowing sleeve 30 to rotate more freely about core 20.

Figure 6:
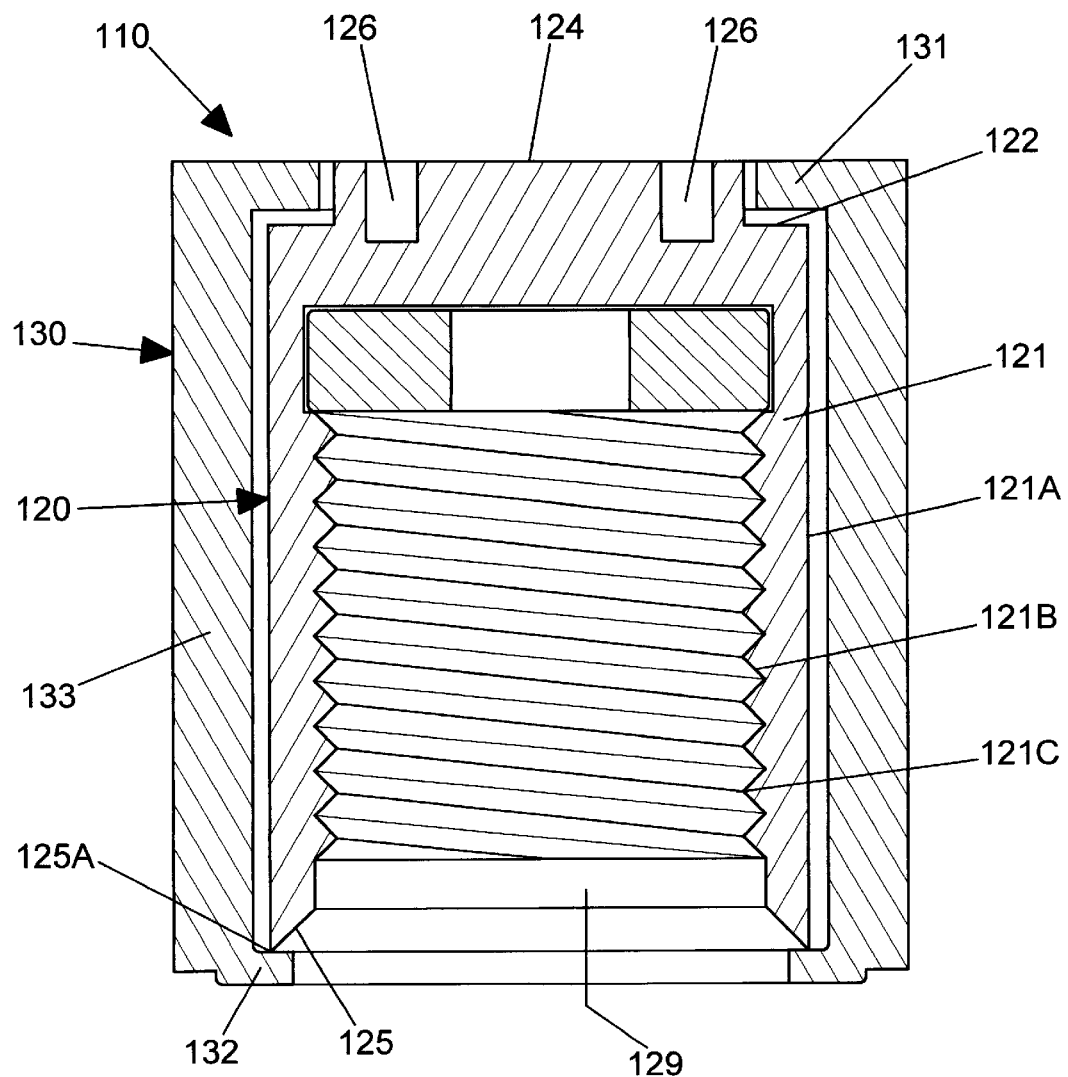
FIG. 6 is a sectional view of an alternative embodiment of the valve cap.

A sectional view of an alternate embodiment of the valve cap of this invention is shown in FIG. 6. As shown, valve cap 110 is also of two piece construction comprising an inner core 120 and outer sleeve 130 and operating much in the same manner as the previously described embodiment. Inner core 120 is of a hollow cylindrical shape having a sidewall 121 with an exterior surface 121A and interior surface 121B with the interior surface provided with threads 121 C for engagement with threads 41 of valve stem 40. Inner core 120 also has an upper surface 124 which includes keyways 126. The lower end of sidewall 121 is tapered at 125 thus forming a knife-like edge 125A. As shown, the top end of core 120 is provided with a channel 122 about the entire circumference of the core.

As with the previously described embodiment and as shown in FIG. 6, outer sleeve 130 is of hollow cylindrical shape and surrounds inner core 120 and is rotatable about core 120. The upper end of sleeve 130 is provided with flange 131 which extends inwardly at a right angle to sleeve 130 and extends into channel 122 of inner core 120. The lower end of sleeve 130 is provided with flange 132 which extends inwardly a distance from wall 133 and at a right angle thereto. Flange 132 provides a support for inner core 120. As was the case with the embodiment shown in FIGS. 3 and 4, the knife-like edge 125A rests on flange 132 reducing the friction between core 120 and sleeve 130 allowing the sleeve to rotate more freely about core 120.

In assembling valve cap 10, inner core 20 is inserted into outer sleeve 30 before flange 25B is formed. Once the core is properly positioned within sleeve 30, flange 25B is formed by bending lower rim 25 outwardly at about a right angle to core 20, thus locking the two components together to form the valve cap. Similarly, valve cap 110 is formed by inserting inner core 120 into outer sleeve 130 before flange 132 is formed. Once core 120 is properly positioned within sleeve 130, flange 132 is formed by bending the lower end of sidewall 133 inwardly at about a right angle.

I claim:

1. A cap for sealing a pneumatic valve stem comprising:
   a. an inner core positioned within an outer sleeve with said inner core adapted to seal a valve and being a hollow cylinder one end of which is open with the opposite end being closed and forming a solid surface, the interior of said inner core provided with means for engaging the exterior surface of the valve stem;
   b. said outer sleeve being a hollow cylinder with two open ends and said outer sleeve surrounding substantially all of the sides of said inner core and being rotatable about said inner core in such a manner that a portion of the solid surface end of said inner core is exposed;
   c. means for locking said inner core and outer sleeve together to form a unitary valve cap while permitting the outer sleeve to rotate about the core; and
   d. means positioned in the exposed surface of said inner core for engagement with a tool such that rotation of said tool causes rotation of said inner core.

2. The cap of claim 1 wherein said means for engaging the exterior surface of the valve stem are threads located on said interior surface of said inner core.

3. The cap of claim 1 wherein said means for locking said inner core and outer sleeve together comprise a top annular flange and a bottom annular flange positioned such that said inner core and said outer sleeve are locked together.

4. The cap of claim 3 wherein said means for locking said inner core and outer sleeve together comprise a top annular flange and a bottom annular flange positioned on said inner core such that said outer sleeve is locked between said annular flanges.

5. The cap of claim 4 wherein said top annular flange is tapered inwardly from said solid surface of said innercore and said bottom flange extends outwardly at about a right angle from said inner core.

6. The cap of claim 5 wherein the top open end of said outer sleeve is tapered such that it is complementary to the inward taper of said top annular flange of said inner core.

7. The cap of claim 6 wherein the bottom open end of said outer sleeve is tapered inwardly forming a knife-like edge which bears against said bottom annular flange of said inner core.

8. The cap of claim 3 wherein said means for locking said inner core and outer sleeve together comprise a top annular flange and a bottom annular flange positioned on said outer sleeve such that said inner core is locked between said annular flanges.

9. The cap of claim 8 wherein said inner core is provided with a channel about the entire circumference of said solid surface.

10. The cap of claim 9 wherein said top annular flange extends inwardly at about a right angle and extends into said channel with said bottom flange also extending inwardly at about a right angle such that said inner core is locked between said annular flanges of said outer sleeve.

11. The cap of claim 10 wherein the bottom of said inner core is tapered and forms a knife-like edge which bears against said bottom annular flange of said outer sleeve.

12. The cap of claim 1 wherein said means positioned in the exposed surface of said inner core for engagement with said tool include keyways adapted to receive a key on said tool.

* * * * *